United States Patent Office 3,314,004
Patented Apr. 11, 1967

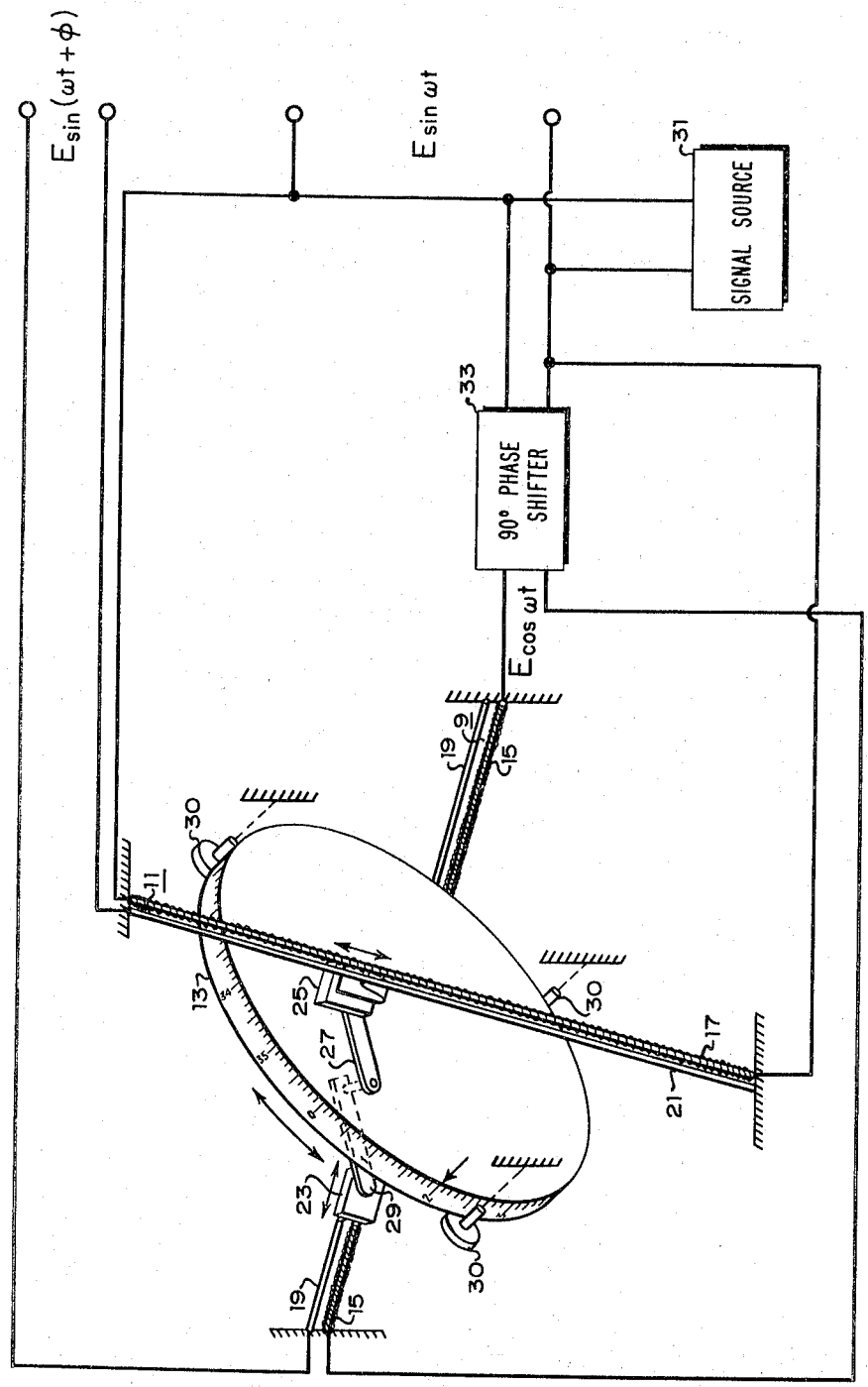

3,314,004
WIDEBAND PHASE SHIFTER SELECTABLY ALTERING THE PHASE ANGLE OF AN APPLIED SIGNAL
Ronald Grob, Grafton, Wis., assignor to Hewlett-Packard Company, Palo Alto, Calif., a corporation of California
Filed Jan. 29, 1965, Ser. No. 428,967
1 Claim. (Cl. 323—108)

This invention relates to an electromechanical device for shifting the phase angle of an electrical signal as a linear function of dial rotation.

It is an object of the present invention to provide an electromechanical phase shifter which operates over a wide range of frequencies.

It is still another object of the present invention to provide phase shifting apparatus in which the amplitude of the phase-shifted signal remains constant with variations in phase angle.

It is still another object of the present invention to provide improved phase shifting apparatus which is continuously adjustable over any multiple number or fractional portion of 360 electrical degrees.

In accordance with the illustrated embodiment of the present invention, a pair of linear potentiometers which are orthogonally oriented and spatially separated are connected to receive quadrature components of an electrical signal which is to be shifted in phase angle. A calibrated dial disposed between the potentiometers has a rotatable crank arm on each side of the dial. The arms engage sliders of the potentiometers and actuate them to undergo reciprocating motion along the potentiometers in response to rotational motion of the dial. The signals on the sliding contacts of the potentiometers are combined to produce an output signal which has a phase-shift angle with respect to the applied signal that is linearly related to angular rotation of the dial and that has constant amplitude for all settings of the dial.

These and other objects of the present invention will be apparent from a reading of this specification and an inspection of the accompanying drawing which shows a perspective view of the apparatus of the present invention.

In the drawing, a pair of linear potentiometers 9 and 11 are shown oriented at right angles with respect to each other and located on opposite sides of dial 13. Each potentiometer includes a resistive element 15, 17, a longitudinal contact 19, 21 and a slider 23, 25 connecting the longitudinal contact 19, 21 and a selected point on the resistive element 15, 17. The sliders 23, 25 are actuated by the dial 13 through crank arms 27, 29 which are rigidly coupled together to form a link of fixed length between the sliders 23, 25, the rigidly coupled arms being rotatably mounted on the dial 13 at opposite sides thereof about an axis eccentric to or spaced away from the axis of rotation of the dial, as shown in the drawing. Rollers 30 support dial 13 about its periphery, thereby eliminating a center support at the axis of rotation.

In operation, an electrical signal from source 31 (say, a sine wave) the phase angle of which is to be shifted is applied across resistive element 17 of linear potentiometer 11 and the quadrature signal (i.e. the cosine wave) from phase shifter 33 is applied across resistive element 15 of linear potentiometer 9. Rotation of the dial 13 to a selected phase angle setting determine the positions of the sliders 23 and 25 along the resistive elements 15 and 17. The signals at the selected positions on the resistive elements 15 and 17 are combined to form an output signal which has a phase angle $\phi$ with respect to the applied signal that is shifted by the value selected by the dial setting. The amplitude of this output signal is constant for all dial settings, as can be shown using Pythagoras' Theorem on a "triangle" (viewed in a plane) formed about the "intersection" of the resistive elements by a line drawn between the sliders where the angle of dial rotation is the angle between this line and a resistive element.

I claim:
Apparatus for selectably shifting the phase of an applied signal comprising:
 a pair of terminals for receiving an applied signal;
 first and second linear potentiometers each including a resistance element disposed along an axis and including a movable contact which is slidable along the resistance element, the resistance elements being electrically isolated from each other and the axes of the resistance elements of the first and second linear potentiometers being oriented in spaced, right angle relationship to each other;
 means connecting said pair of terminals to the resistance element of the first linear potentiometer for applying thereto the signal appearing on said pair of terminals;
 phase shift means having input terminals connected to receive applied signal appearing on said pair of terminals for producing therefrom a quadrature signal shifted in phase by 90° with respect to the applied signal appearing on said pair of terminals;
 means connecting the resistance element of the second linear potentiometer to receive the quadrature signal from said phase shift means;
 a dial disposed intermediate the spaced first and second linear potentiometers rotatable about an axis which is normal to the spaced, right-angle crossing of the resistance elements of the first and second potentiometers;
 a link of selectable length mechanically coupling together said movable contacts and being rotatably mounted on the dial about an axis parallel to and spaced away from the rotational axis of the dial for imparting to the movable contacts coupled to said link translational motion along the resistive elements in response to rotation of said dial; and
 means connected to said movable contacts for providing an output which is shifted in phase angle relative to an applied signal appearing on said pair of terminals by a value represented by the angular position of said dial.

References Cited by the Examiner
UNITED STATES PATENTS

| | | | |
|---|---|---|---|
| 2,416,363 | 2/1947 | Wellings | 338—90 X |
| 2,532,368 | 12/1950 | Malmqvist et al. | 323—122 |
| 2,701,875 | 2/1955 | Baltzer | 323—121 X |
| 3,122,673 | 2/1964 | Dutton et al. | 338—39 X |

OTHER REFERENCES

Tomek, R. E.: "Potentiometer Resolver," IBM Technical Disclosure bulletin, vol. 5, No. 1, page 25, June 1962, 338-89.

JOHN F. COUCH, *Primary Examiner.*

A. D. PELLINEN, *Assistant Examiner.*